(12) United States Patent
Frey et al.

(10) Patent No.: US 10,975,701 B2
(45) Date of Patent: *Apr. 13, 2021

(54) CERAMIC MATRIX COMPOSITE COMPONENT COOLING

(71) Applicant: General Electric Company, Schenectady, NY (US)

(72) Inventors: David Alan Frey, West Chester, OH (US); Samir Armando Salamah, Niskayuna, NY (US); Charles William Craig, III, West Chester, OH (US)

(73) Assignee: General Electric Company, Schenectady, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/386,578

(22) Filed: Apr. 17, 2019

(65) Prior Publication Data

US 2019/0242263 A1    Aug. 8, 2019

Related U.S. Application Data

(63) Continuation of application No. 15/232,880, filed on Aug. 10, 2016, now Pat. No. 10,309,242.

(51) Int. Cl.
   *F01D 5/18*    (2006.01)
   *F01D 9/04*    (2006.01)

(52) U.S. Cl.
   CPC .............. *F01D 5/181* (2013.01); *F01D 9/041* (2013.01); *F01D 5/187* (2013.01);
   (Continued)

(58) Field of Classification Search
   CPC ................................. F01D 5/181; F01D 5/187
   See application file for complete search history.

(56) References Cited

U.S. PATENT DOCUMENTS

| 2,744,723 A | * | 5/1956 | Roush ..................... F01D 5/181 |
|   |   |   | 416/96 R |
| 2,787,441 A | * | 4/1957 | Bartlett ................... F01D 5/189 |
|   |   |   | 416/92 |

(Continued)

FOREIGN PATENT DOCUMENTS

| CH | 555000 A | * | 10/1974 | ............. F01D 5/189 |
| DE | 2042947 A1 | * | 6/1971 | ............... F01D 9/04 |

(Continued)

*Primary Examiner* — Ninh H. Nguyen
*Assistant Examiner* — Brian Christopher Delrue
(74) *Attorney, Agent, or Firm* — Dority & Manning, P.A.

(57) ABSTRACT

Ceramic matrix composite (CMC) airfoils and methods for forming CMC airfoils are provided. In one embodiment, an airfoil is provided that includes opposite pressure and suction sides extending radially along a span and opposite leading and trailing edges extending radially along the span. The leading edge defines a forward end of the airfoil, and the trailing edge defines an aft end of the airfoil. A trailing edge portion is defined adjacent the trailing edge at the aft end, and a pocket is defined in and extends within the trailing edge portion. A heat pipe is received in the pocket. A method for forming an airfoil is provided that includes laying up a CMC material to form an airfoil preform assembly; processing the airfoil preform assembly; defining a pocket in a trailing edge portion of the airfoil; and inserting a heat pipe into the pocket.

20 Claims, 13 Drawing Sheets

(52) U.S. Cl.
CPC ...... *F05D 2230/50* (2013.01); *F05D 2260/20* (2013.01); *F05D 2260/208* (2013.01); *F05D 2300/6033* (2013.01); *Y02T 50/60* (2013.01)

(56) References Cited

U.S. PATENT DOCUMENTS

| | | | | |
|---|---|---|---|---|
| 2,888,242 | A * | 5/1959 | Williams | F01D 5/187 |
| | | | | 416/90 R |
| 3,287,906 | A * | 11/1966 | McCormick | F28D 15/0208 |
| | | | | 60/39.511 |
| 3,301,527 | A * | 1/1967 | Kercher | F01D 5/189 |
| | | | | 415/115 |
| 3,348,414 | A * | 10/1967 | Waters | G01K 13/02 |
| | | | | 374/115 |
| 4,199,300 | A * | 4/1980 | Tubbs | F01D 11/18 |
| | | | | 415/114 |
| 4,218,179 | A * | 8/1980 | Barry | F01D 5/189 |
| | | | | 415/114 |
| 4,419,044 | A * | 12/1983 | Barry | F01D 11/24 |
| | | | | 415/117 |
| 4,580,613 | A * | 4/1986 | Miller | B22D 27/045 |
| | | | | 164/122.2 |
| 4,671,348 | A * | 6/1987 | Bauer | B64C 3/36 |
| | | | | 165/104.26 |
| 4,702,439 | A * | 10/1987 | Kelley | B64G 1/58 |
| | | | | 244/131 |
| 4,838,346 | A * | 6/1989 | Camarda | F28D 15/0233 |
| | | | | 165/104.14 |
| 4,921,041 | A * | 5/1990 | Akachi | F28D 15/00 |
| | | | | 165/104.14 |
| 4,966,229 | A * | 10/1990 | Senterfitt | B64C 1/38 |
| | | | | 165/169 |
| 4,998,584 | A * | 3/1991 | Foglesonger | F28F 13/00 |
| | | | | 165/134.1 |
| 5,151,012 | A * | 9/1992 | Hough | F01D 5/181 |
| | | | | 416/95 |
| 5,178,514 | A * | 1/1993 | Damiral | F01D 11/08 |
| | | | | 415/114 |
| 5,192,186 | A * | 3/1993 | Sadler | F01D 11/18 |
| | | | | 415/177 |
| 5,246,341 | A * | 9/1993 | Hall | F01D 5/187 |
| | | | | 416/97 R |
| 5,439,351 | A * | 8/1995 | Artt | F01D 5/185 |
| | | | | 416/95 |
| 5,720,339 | A * | 2/1998 | Glass | B64G 1/506 |
| | | | | 165/104.26 |
| 5,975,841 | A * | 11/1999 | Lindemuth | F01D 5/181 |
| | | | | 415/114 |
| 6,219,590 | B1 | 4/2001 | Bernaden, III et al. | |
| 6,430,931 | B1 * | 8/2002 | Horner | F04D 29/5826 |
| | | | | 60/785 |
| 7,131,612 | B2 * | 11/2006 | Baptist | F02C 7/14 |
| | | | | 244/134 R |
| 7,377,098 | B2 * | 5/2008 | Walker | F01D 9/065 |
| | | | | 60/39.08 |
| 7,900,438 | B2 * | 3/2011 | Venkataramani | F02C 7/14 |
| | | | | 60/267 |
| 7,966,807 | B2 | 6/2011 | Norris et al. | |
| 8,157,512 | B2 * | 4/2012 | Zhang | F02C 7/143 |
| | | | | 415/175 |
| 8,240,975 | B1 * | 8/2012 | Ryznic | F04D 29/584 |
| | | | | 415/1 |
| 8,596,073 | B2 * | 12/2013 | Zhang | F01D 25/30 |
| | | | | 60/772 |
| 8,616,834 | B2 * | 12/2013 | Knight, III | F01D 9/041 |
| | | | | 415/116 |
| 8,844,877 | B1 * | 9/2014 | Driemeyer | B64C 1/38 |
| | | | | 244/171.7 |
| 9,759,072 | B2 * | 9/2017 | Gregg | F04D 29/542 |
| 9,909,448 | B2 * | 3/2018 | Gerstler | F01D 25/18 |
| 2002/0012588 | A1 | 1/2002 | Matsunaga | F02C 3/05 |
| | | | | 415/232 |
| 2002/0021556 | A1 * | 2/2002 | Dibene, II | H01R 12/7088 |
| | | | | 361/704 |
| 2003/0082048 | A1 * | 5/2003 | Jackson | F01D 5/28 |
| | | | | 415/115 |
| 2005/0050877 | A1 * | 3/2005 | Venkataramani | F02C 7/047 |
| | | | | 60/39.093 |
| 2007/0017208 | A1 * | 1/2007 | Ralls, Jr. | F02C 7/08 |
| | | | | 60/39.511 |
| 2008/0080980 | A1 * | 4/2008 | Norris | F01D 5/181 |
| | | | | 416/97 R |
| 2008/0141954 | A1 * | 6/2008 | Norris | F02C 7/18 |
| | | | | 123/41.21 |
| 2008/0159852 | A1 * | 7/2008 | Stephenson | F02C 7/047 |
| | | | | 415/178 |
| 2008/0247897 | A1 * | 10/2008 | Guthrie | F01C 1/3446 |
| | | | | 418/229 |
| 2008/0310955 | A1 * | 12/2008 | Norris | F02C 7/185 |
| | | | | 415/178 |
| 2010/0236215 | A1 * | 9/2010 | Venkataramani | F28D 7/0008 |
| | | | | 60/39.093 |
| 2010/0236759 | A1 | 9/2010 | Wadley et al. | |
| 2011/0100020 | A1 * | 5/2011 | Zhang | F02C 7/16 |
| | | | | 60/806 |
| 2011/0103939 | A1 * | 5/2011 | Zhang | F02C 7/12 |
| | | | | 415/173.2 |
| 2014/0060084 | A1 * | 3/2014 | Gregg | F04D 29/542 |
| | | | | 60/806 |
| 2015/0280099 | A1 * | 10/2015 | Boukai | H01L 35/32 |
| | | | | 136/203 |
| 2015/0377029 | A1 * | 12/2015 | Blake | F01D 9/065 |
| | | | | 416/232 |
| 2016/0290139 | A1 * | 10/2016 | Snyder | F01D 5/182 |
| 2016/0290174 | A1 * | 10/2016 | Ekanayake | F01K 23/10 |
| 2016/0290233 | A1 * | 10/2016 | Ekanayake | F01K 23/02 |
| 2016/0290234 | A1 * | 10/2016 | Ekanayake | F01D 5/088 |
| 2016/0290235 | A1 * | 10/2016 | Ekanayake | F02C 7/18 |
| 2016/0305279 | A1 * | 10/2016 | Gerstler | F01D 25/18 |
| 2016/0319667 | A1 * | 11/2016 | Zelesky | F02C 3/04 |
| 2017/0067693 | A1 * | 3/2017 | Rush | F28F 7/02 |
| 2017/0159566 | A1 * | 6/2017 | Sennoun | F02C 7/18 |
| 2017/0175631 | A1 * | 6/2017 | Gregg | F01D 9/041 |
| 2018/0058259 | A1 * | 3/2018 | Sharma | F28D 15/0275 |
| 2018/0216473 | A1 * | 8/2018 | Hill | F01D 5/187 |
| 2018/0245472 | A1 * | 8/2018 | Spangler | F01D 5/187 |
| 2018/0306059 | A1 * | 10/2018 | Ranjan | F01D 25/14 |
| 2018/0351069 | A1 * | 12/2018 | Boukai | H01L 35/30 |
| 2018/0372112 | A1 * | 12/2018 | Prabhudharwadkar | F16J 15/162 |

FOREIGN PATENT DOCUMENTS

| | | | | |
|---|---|---|---|---|
| GB | 2286229 A | * | 8/1995 | ............... F28D 15/04 |
| GB | 2286229 A | | 8/1995 | |
| WO | WO92/07227 A1 | | 4/1992 | |
| WO | WO-2017078122 A1 | * | 5/2017 | ............... F02C 7/00 |

* cited by examiner

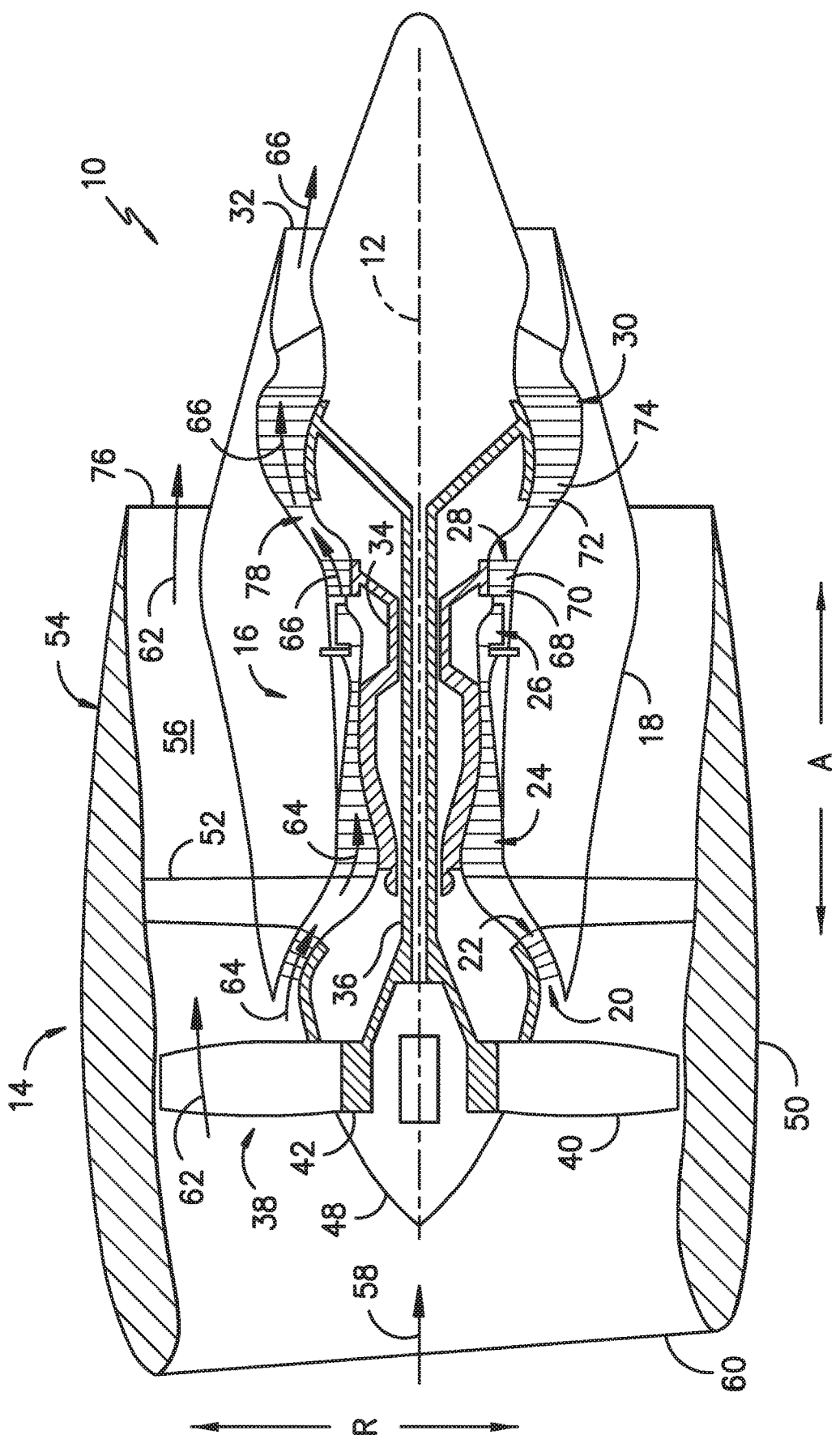
FIG. -1-

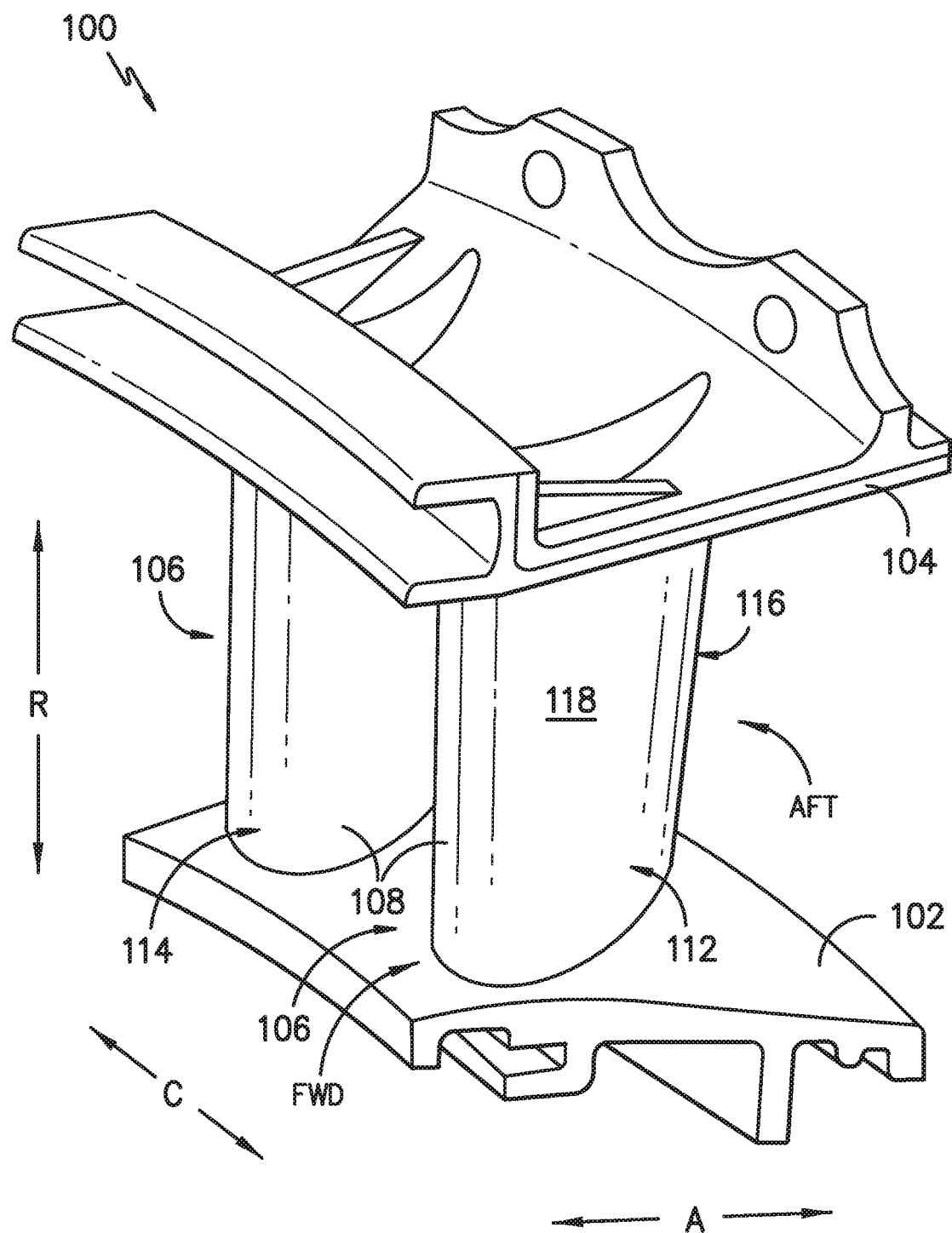
FIG. -2-

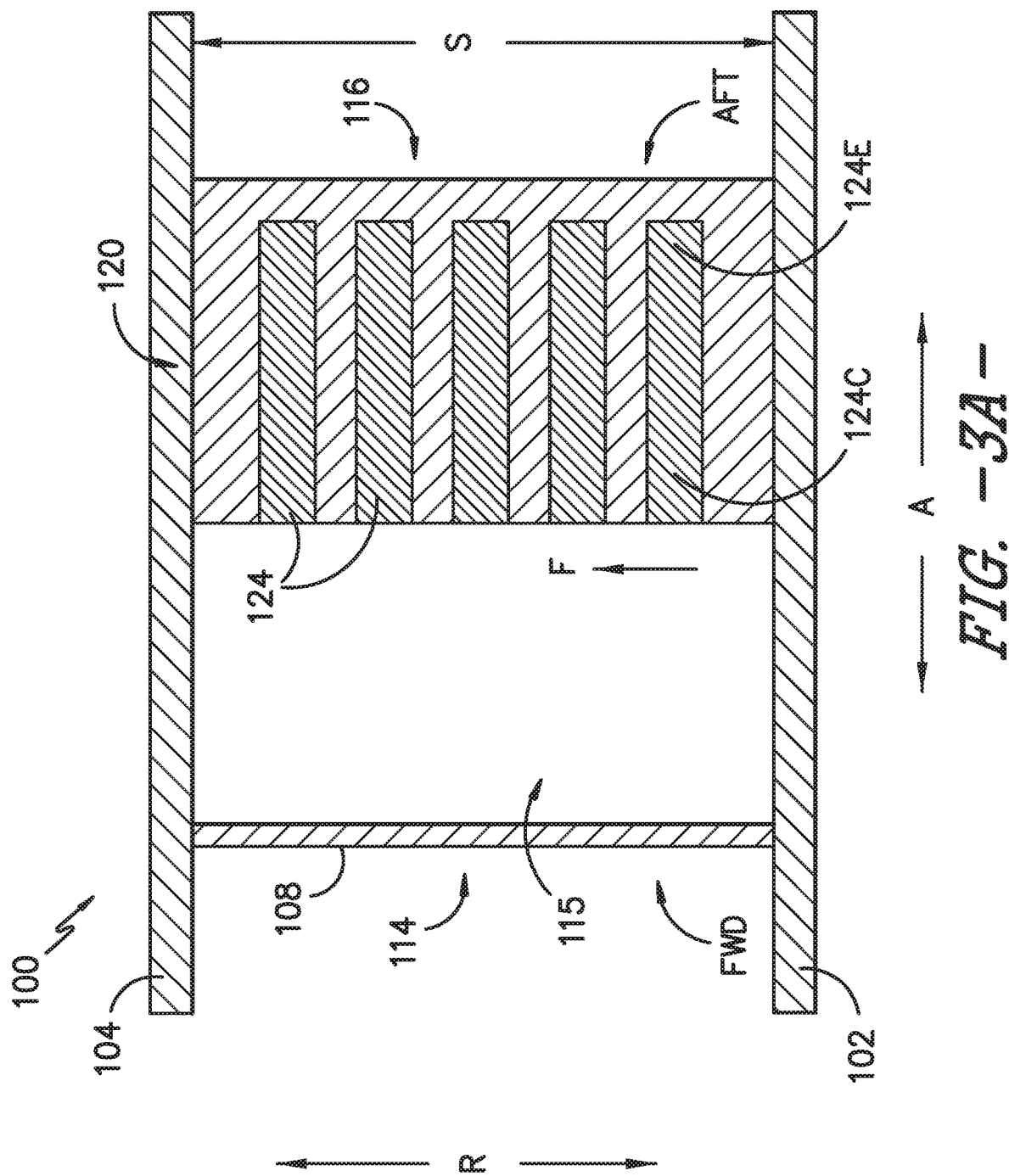
FIG. -3A-

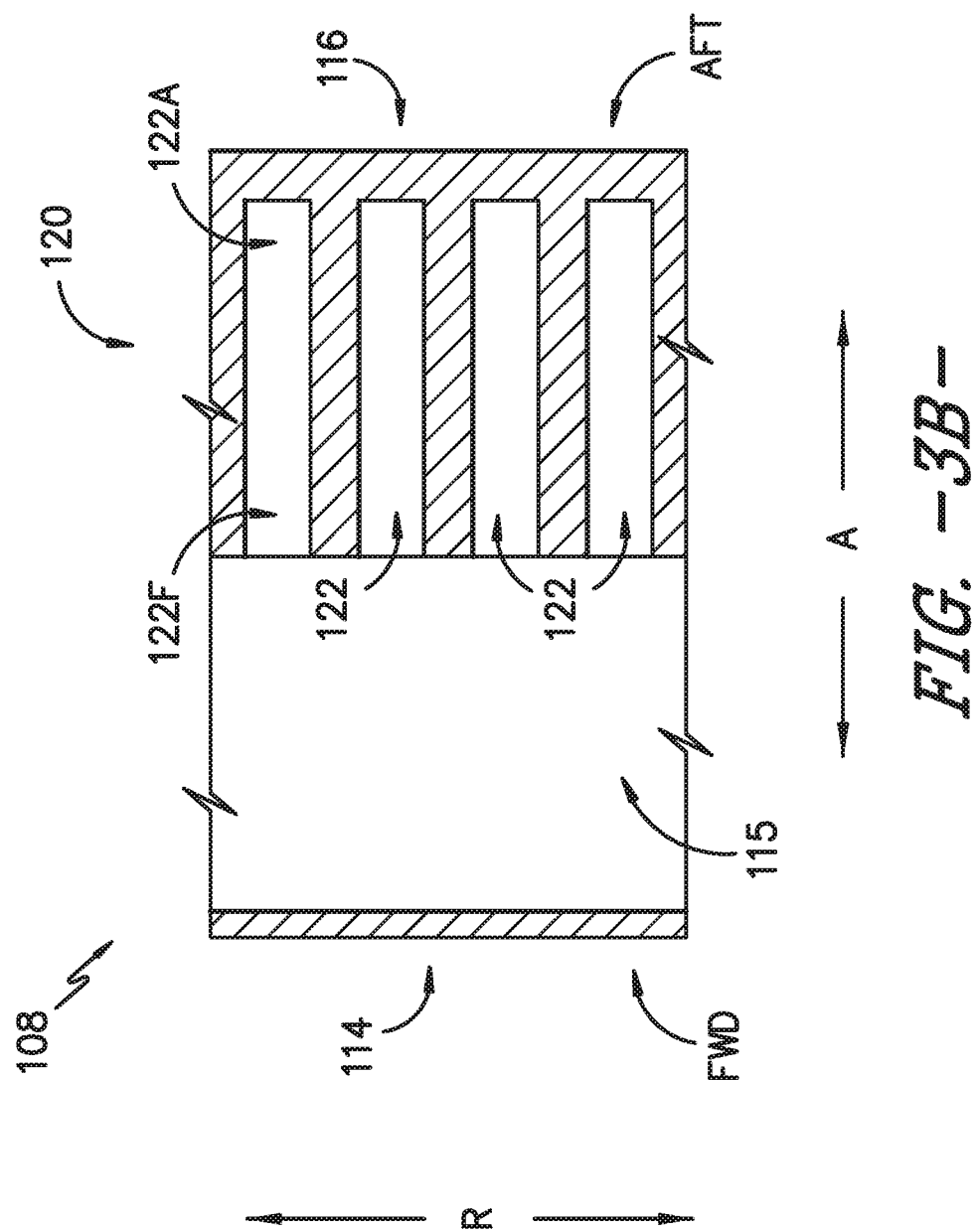
FIG. -3B-

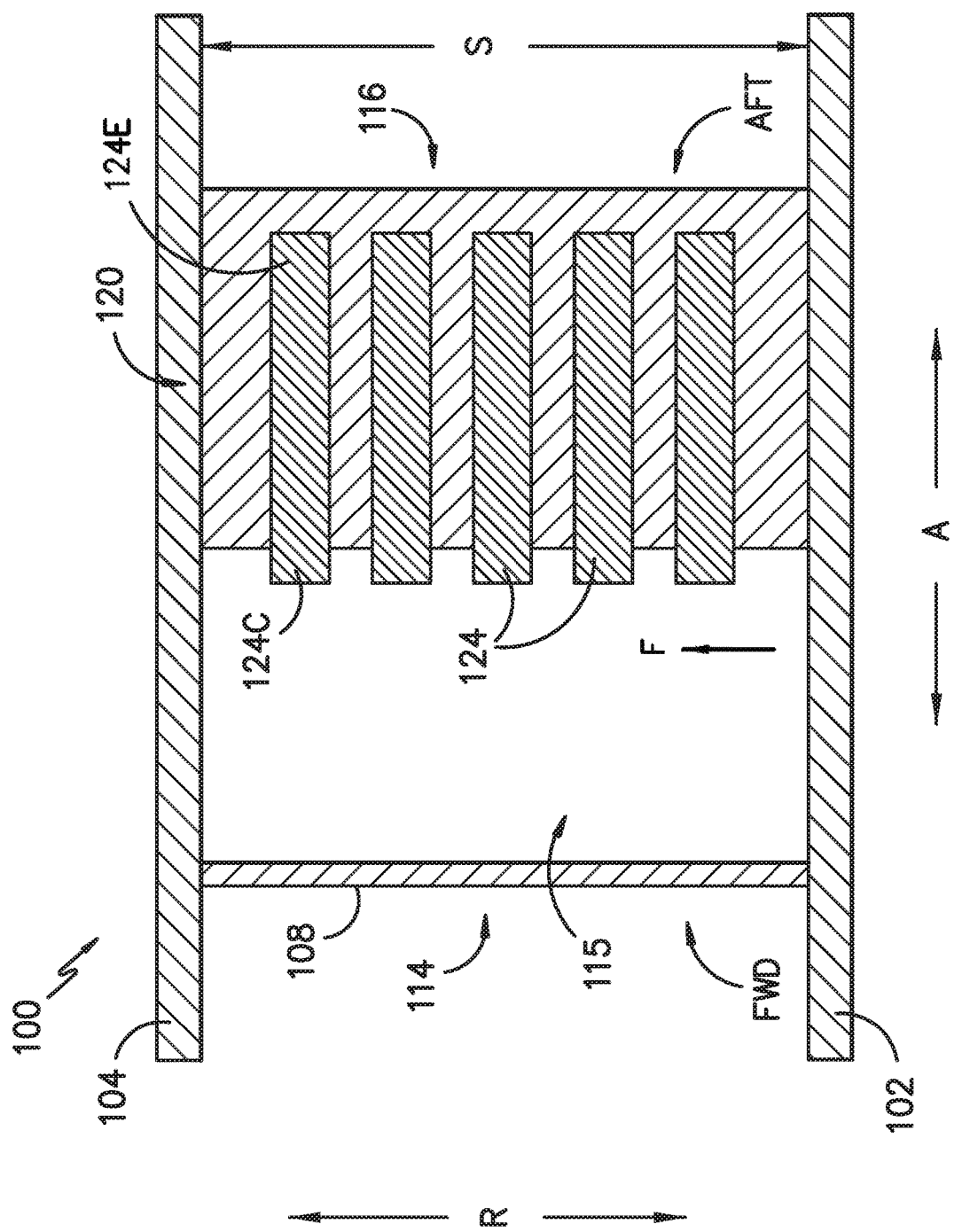

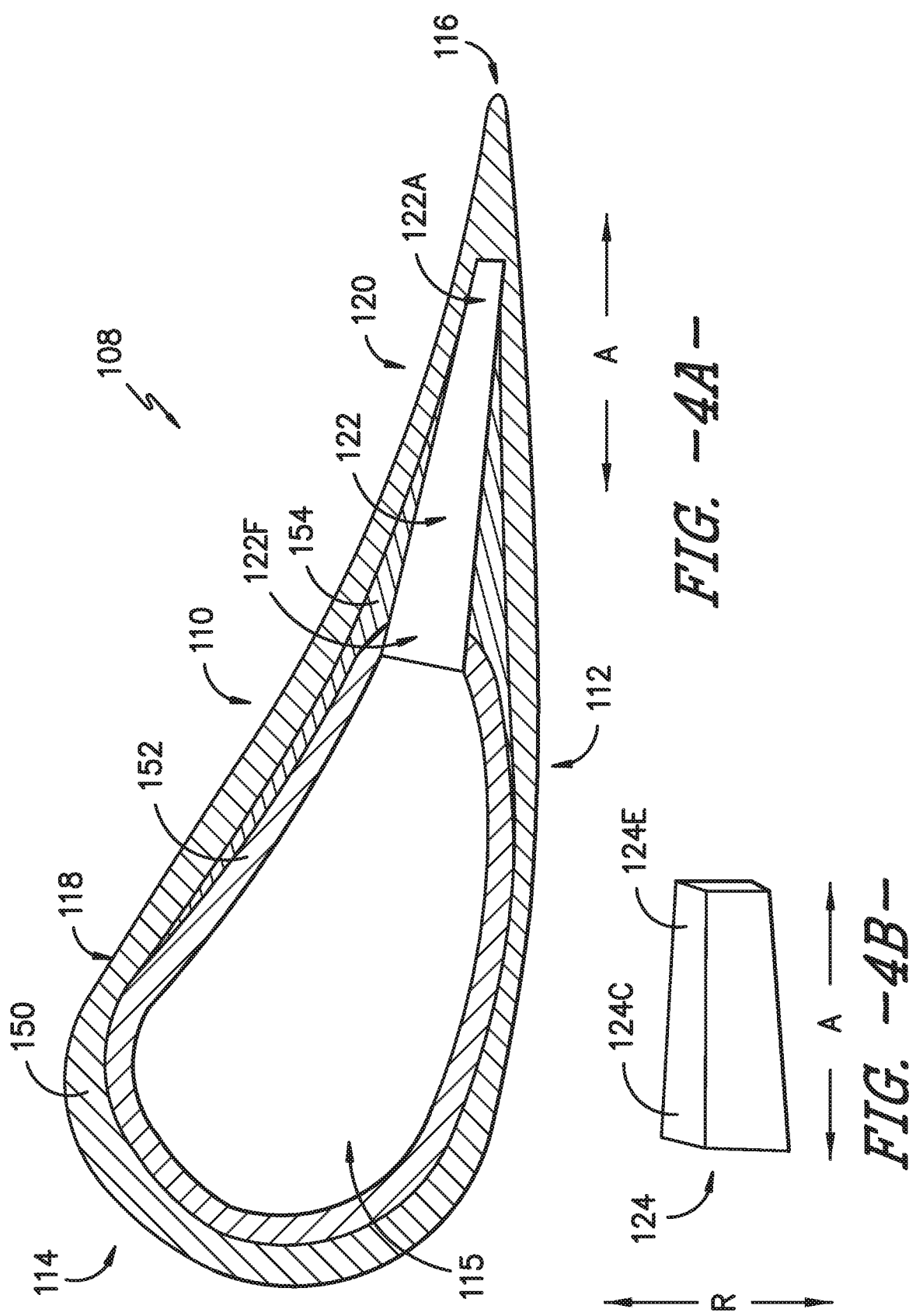

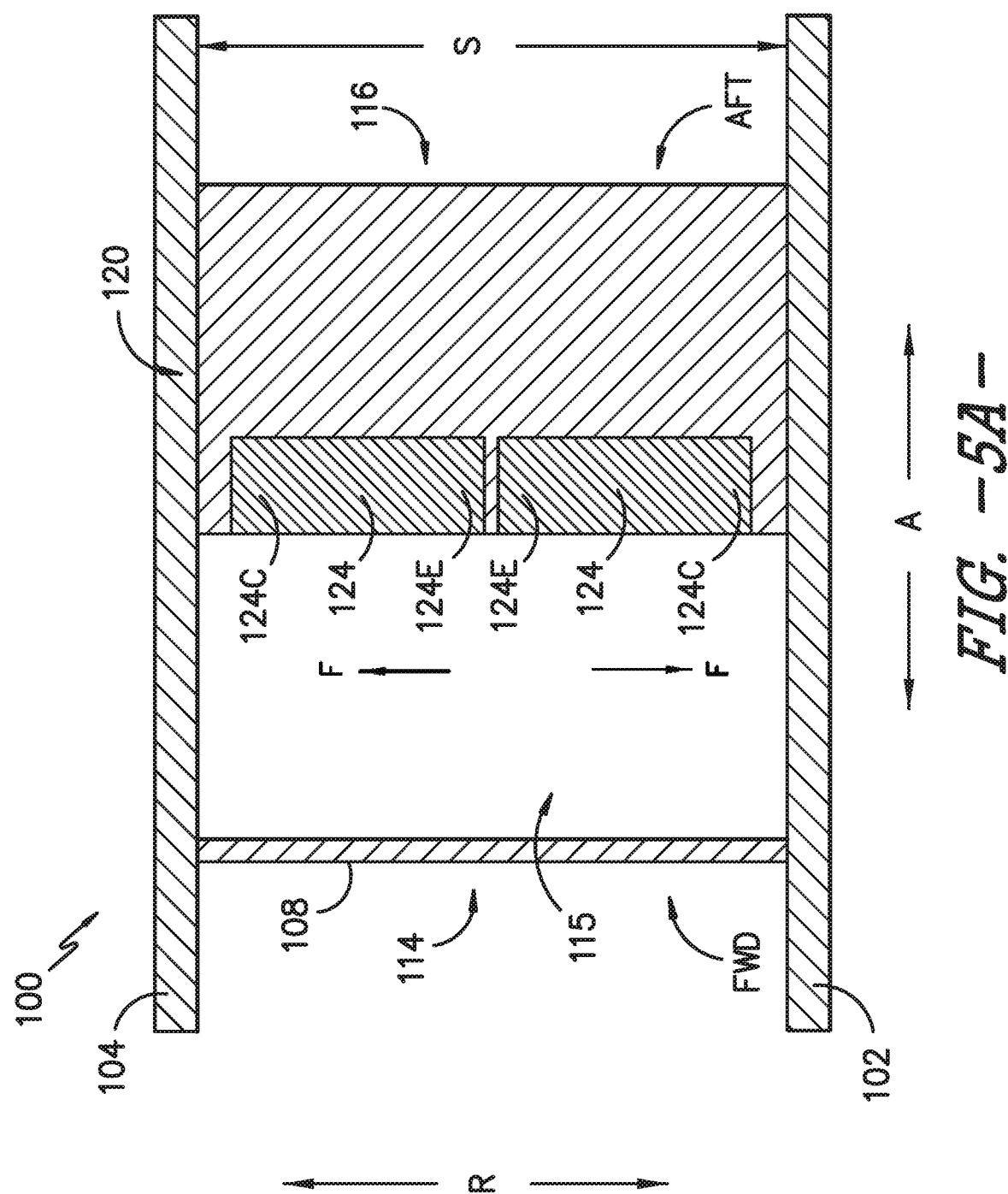
FIG. -5A-

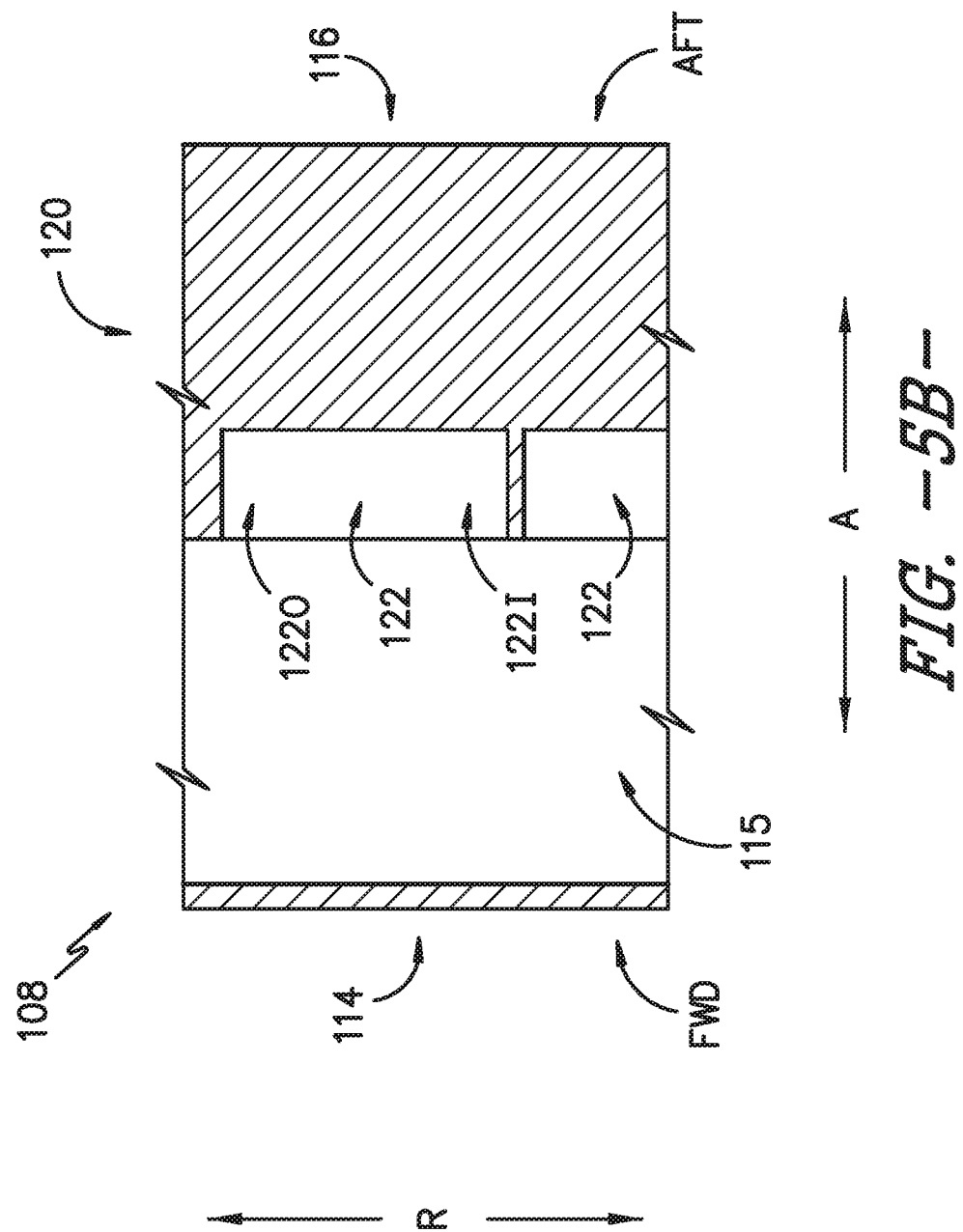

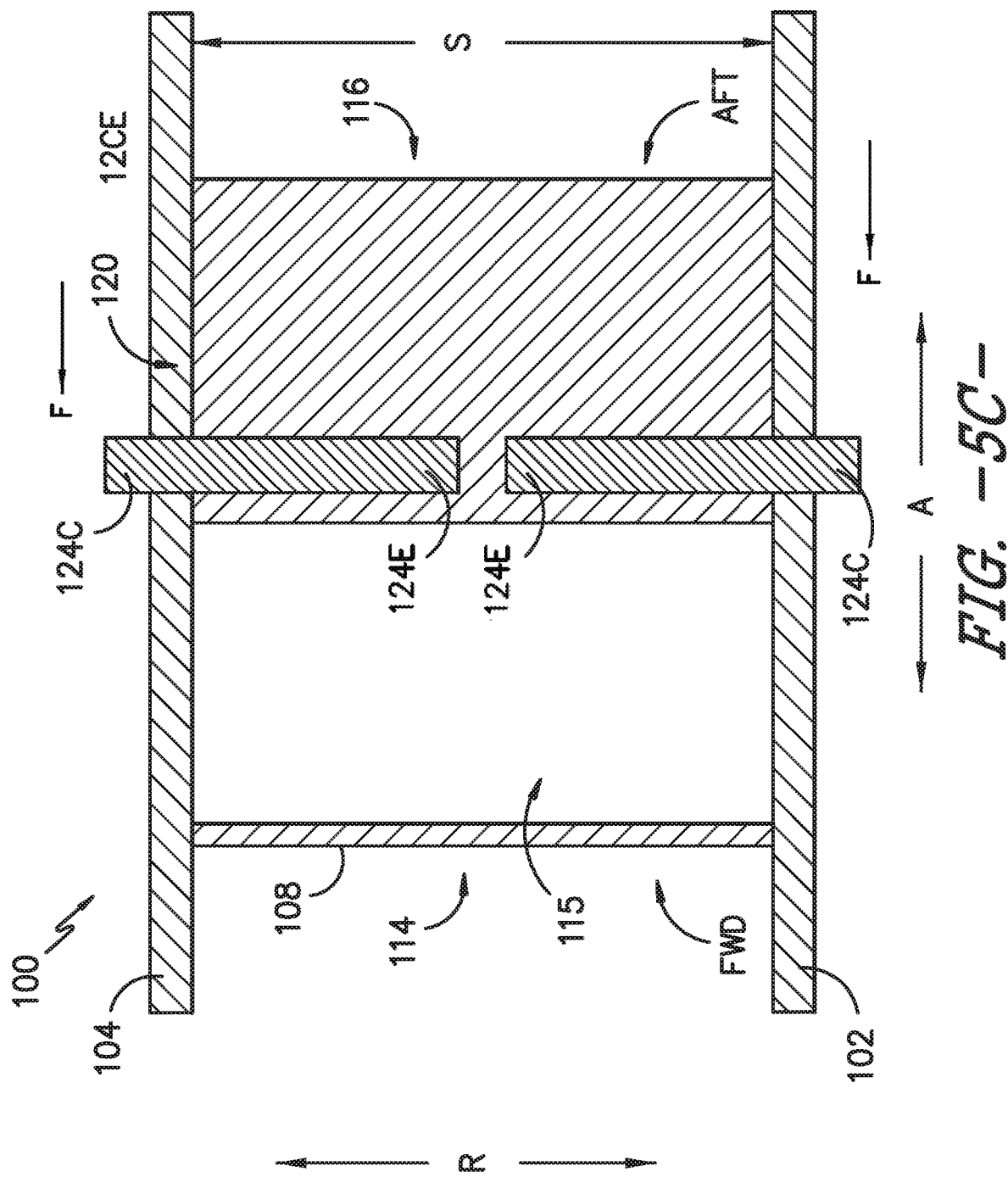

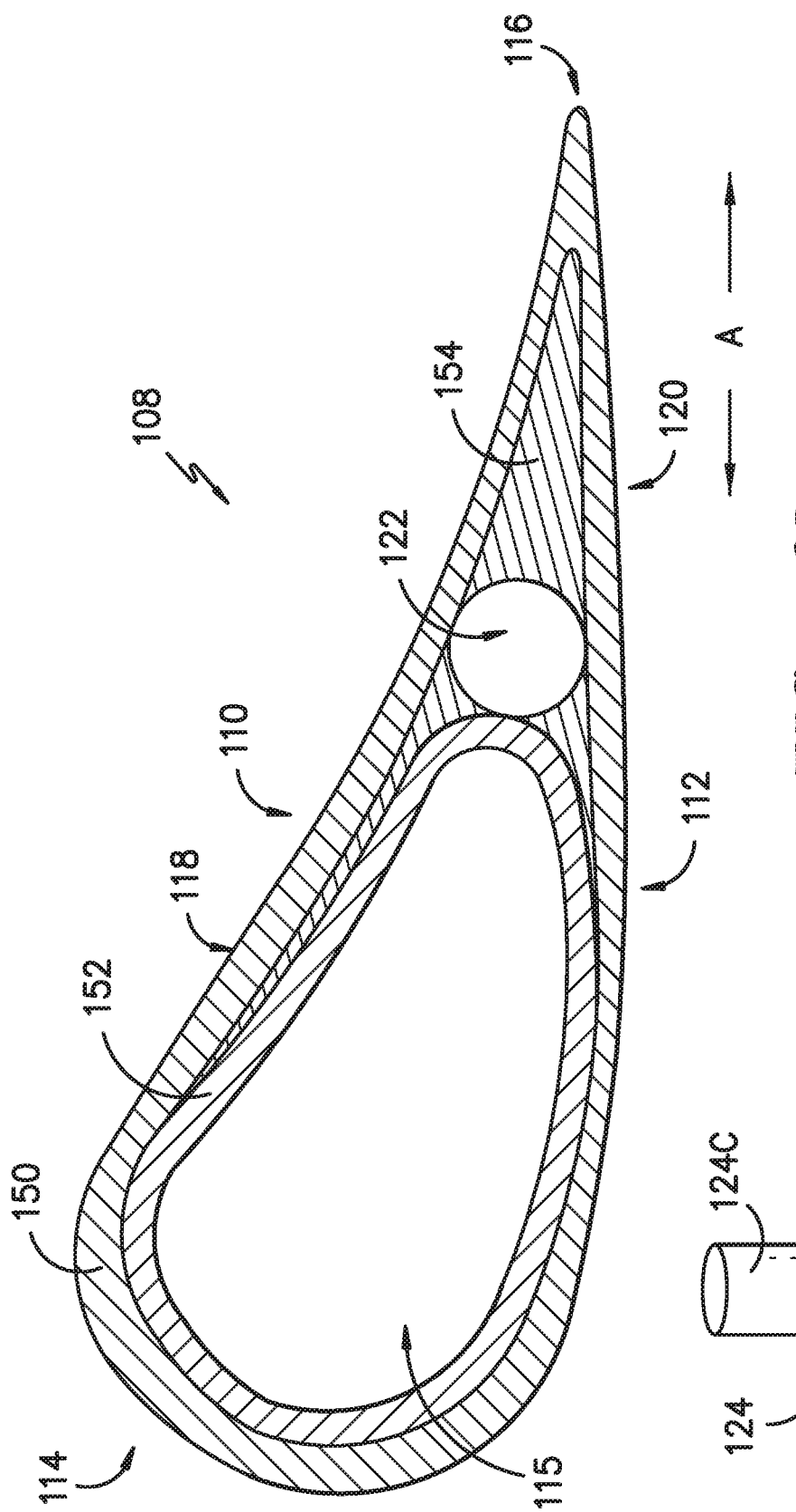
FIG. -6A-
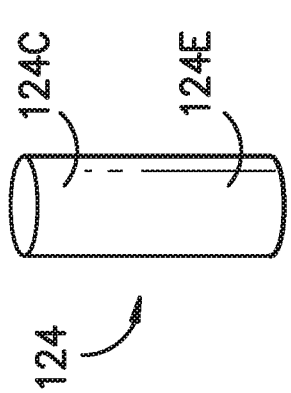
FIG. -6B-

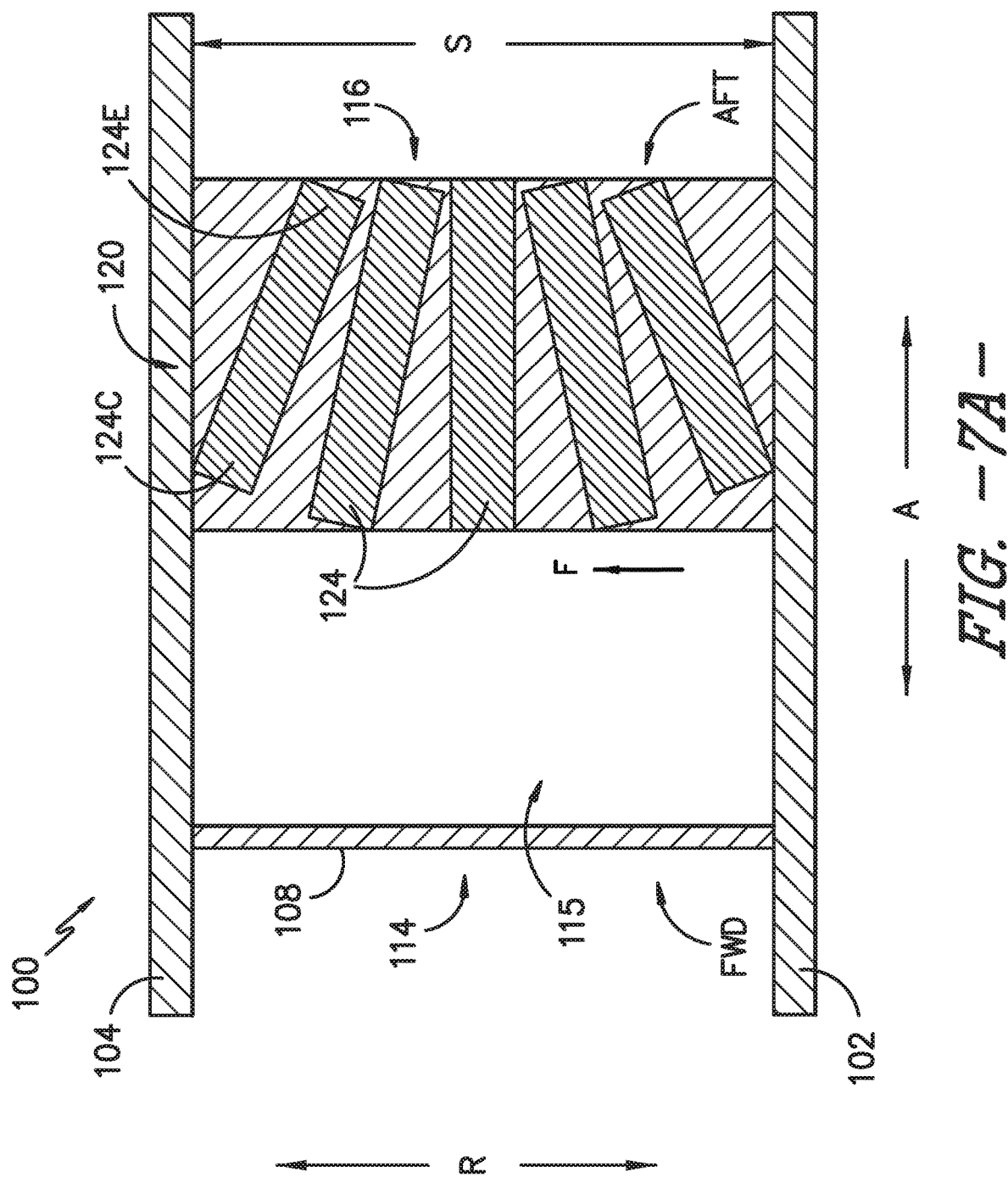
FIG. -7A-

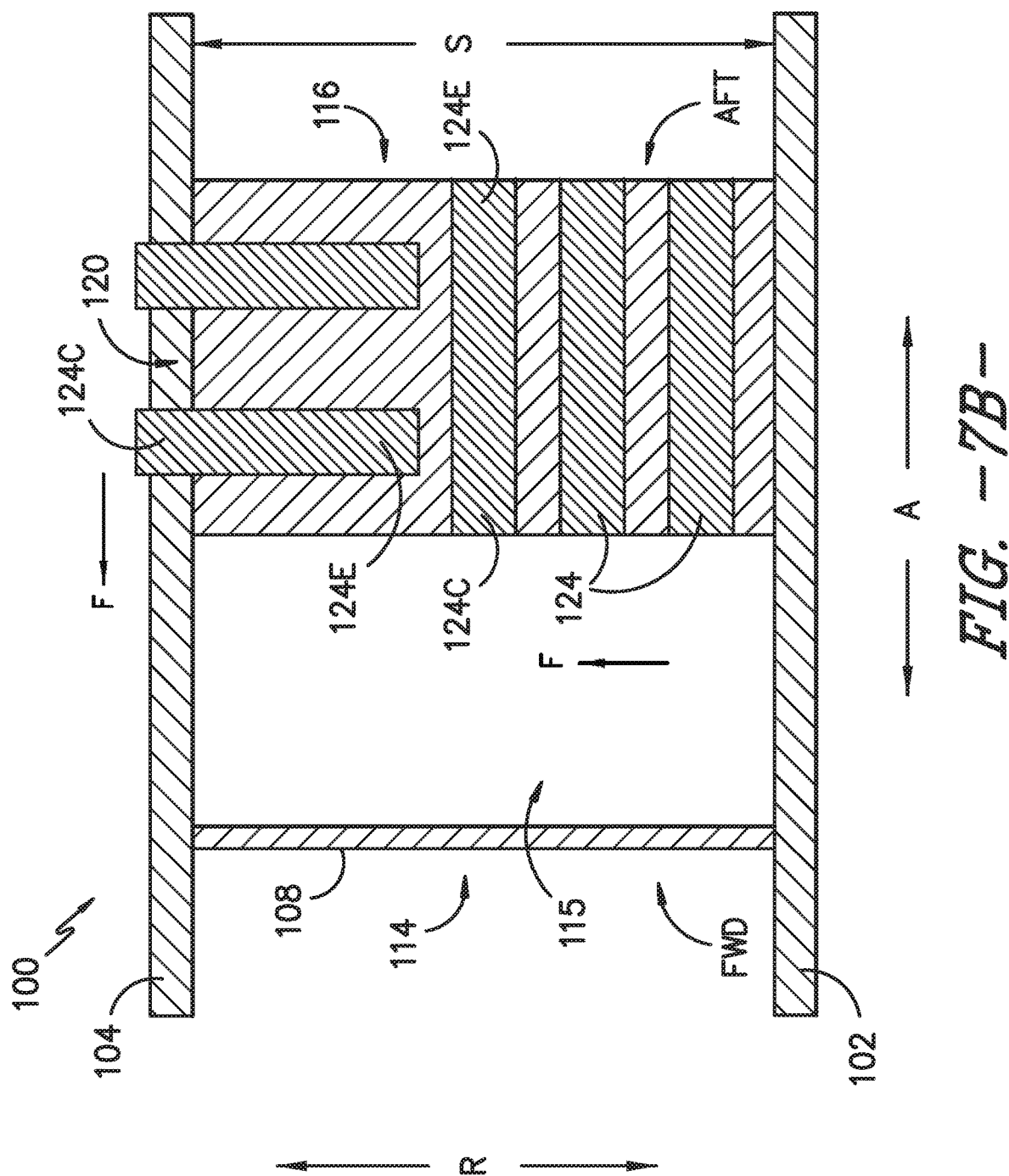
FIG. -7B-

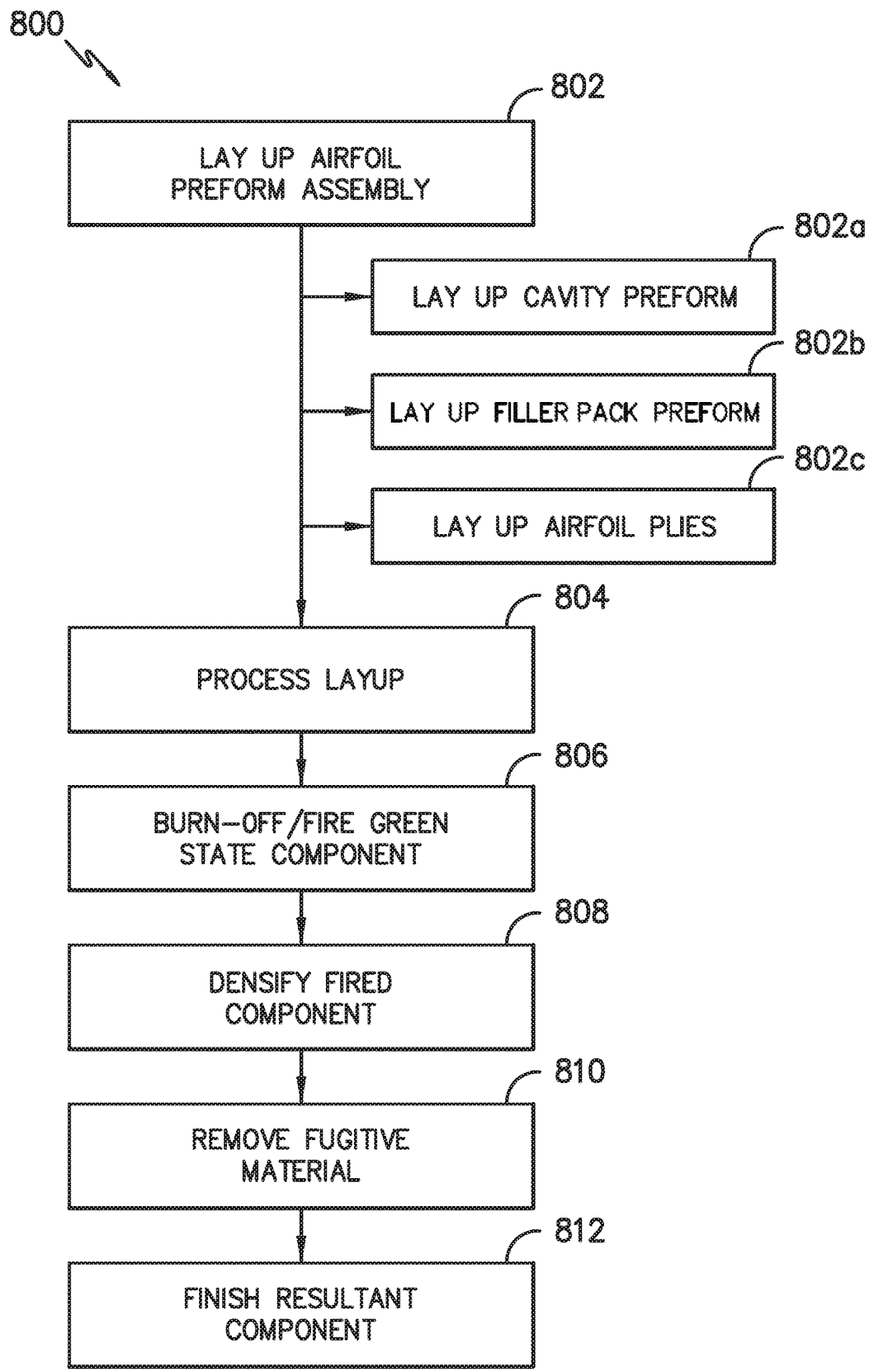
FIG. -8-

CERAMIC MATRIX COMPOSITE COMPONENT COOLING

CROSS-REFERENCE TO RELATED APPLICATIONS

This application is a continuation of and claims priority to U.S. application Ser. No. 15/232,880, filed Aug. 10, 2016, the contents of which are incorporated herein by reference.

FIELD OF THE INVENTION

The present subject matter relates generally to ceramic matrix composite components and particularly to features for cooling ceramic matrix composite components of gas turbine engines. More particularly, the present subject matter relates to trailing edge cooling for ceramic matrix component airfoils of gas turbine engines.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. Non-traditional high temperature materials, such as ceramic matrix composite (CMC) materials, are more commonly being used for various components within gas turbine engines. For example, because CMC materials can withstand relatively extreme temperatures, there is particular interest in replacing components within the flow path of the combustion gases with CMC materials. However, even though CMC components may withstand more extreme temperatures than typical components, CMC components still may require cooling features or reduced exposure to the combustion gases to decrease a likelihood of negative impacts of increased combustion gas temperatures, e.g., material failures or the like.

More specifically, CMC airfoils for gas turbine engines typically have a cavity for receipt of a cooling fluid located near a forward end of the airfoil, i.e., proximate a leading edge of the airfoil. Often, an aft end of the airfoil, i.e., proximate a trailing edge of the airfoil, does not have a cavity and is not near a cavity for receipt of a cooling fluid or other feature(s) for cooling the aft end, and thus, the aft end of the airfoil remains uncooled, which can produce a large temperature gradient between the forward end and the aft end. A large temperature gradient across the airfoil can increase the thermal stress or strain on the airfoil, which can lead to material failures, reduced life of the airfoil, or other negative impacts on turbine performance.

Therefore, improved cooling features for gas turbine components, and specifically CMC components for gas turbine engines, that overcome one or more disadvantages of existing components would be desirable. In particular, an airfoil for a gas turbine engine having cooling features in a trailing edge portion of the airfoil would be beneficial. Moreover, a turbine nozzle for a gas turbine engine having cooling features in a trailing edge portion of an airfoil of the turbine nozzle that even out cooling of the airfoil would be desirable. Further, a CMC airfoil having cooling features in a trailing edge portion of the airfoil would be useful. Methods for forming a CMC airfoil of a gas turbine engine such that the airfoil has one or more cooling features in a trailing edge portion of the airfoil also would be advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an airfoil for a gas turbine engine is provided. The airfoil includes opposite pressure and suction sides extending radially along a span and opposite leading and trailing edges extending radially along the span. The pressure and suction sides extend axially between the leading and trailing edges. The leading edge defines a forward end of the airfoil, and the trailing edge defines an aft end of the airfoil. The airfoil further includes a trailing edge portion defined adjacent the trailing edge at the aft end and a pocket defined in the trailing edge portion. The pocket extends within the trailing edge portion, and a heat pipe is received in the pocket.

In another exemplary embodiment of the present disclosure, a method for forming a ceramic matrix composite (CMC) airfoil for a gas turbine engine is provided. The method comprises laying up a CMC material to form an airfoil preform assembly. The airfoil preform assembly defines an airfoil shape having opposite pressure and suction sides extending radially along a span and opposite leading and trailing edges extending radially along the span. The pressure and suction sides extend axially between the leading and trailing edges. The leading edge defines a forward end of the airfoil, and the trailing edge defines an aft end of the airfoil. The airfoil shape also has a trailing edge portion defined adjacent the trailing edge at the aft end. The method further comprises processing the airfoil preform assembly to produce a green state CMC airfoil; defining a pocket in the trailing edge portion; and inserting a heat pipe into the pocket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a perspective view of a turbine nozzle segment according to an exemplary embodiment of the present subject matter.

FIG. 3A provides a radial cross-section view of the turbine nozzle segment of FIG. 2 according to an exemplary embodiment of the present subject matter.

FIG. 3B provides a portion of the cross-section of FIG. 3A, illustrating pockets defined in an airfoil for receiving heat pipes.

FIG. 3C provides a radial cross-section view of the turbine nozzle segment of FIG. 2 according to another exemplary embodiment of the present subject matter.

FIG. 4A provides an axial cross-section view of the airfoil of the turbine nozzle segment of FIG. 2 according to an exemplary embodiment of the present subject matter.

FIG. 4B provides a perspective view of a heat pipe according to an exemplary embodiment of the present subject matter.

FIG. 5A provides a radial cross-section view of the turbine nozzle segment of FIG. 2 according to another exemplary embodiment of the present subject matter.

FIG. 5B provides a portion of the cross-section of FIG. 5A, illustrating pockets defined in an airfoil for receiving heat pipes.

FIG. 5C provides a radial cross-section view of the turbine nozzle segment of FIG. 2 according to another exemplary embodiment of the present subject matter.

FIG. 6A provides an axial cross-section view of the airfoil of the turbine nozzle segment of FIG. 2 according to another exemplary embodiment of the present subject matter.

FIG. 6B provides a perspective view of a heat pipe according to another exemplary embodiment of the present subject matter.

FIG. 7A provides a radial cross-section view of the turbine nozzle segment of FIG. 2 according to another exemplary embodiment of the present subject matter.

FIG. 7B provides a radial cross-section view of the turbine nozzle segment of FIG. 2 according to another exemplary embodiment of the present subject matter.

FIG. 8 provides a chart illustrating a method for forming an airfoil of a gas turbine engine according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of the combustion and/or turbine sections, may comprise a ceramic matrix composite (CMC) material, which is a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

CMC materials may be used for various components of the engine, for example, airfoils, shrouds, and/or other components in the compressor, turbine, and/or fan regions. As a particular example, turbine nozzles, comprising stator vanes extending between inner and outer bands, direct the hot combustion gases in a manner to maximize extraction at the adjacent downstream turbine blades. As such, CMC materials are desirable for use in forming turbine nozzles exposed to the high temperatures of the hot combustion gases. Of course, other components of turbine engine 10 also may be formed from CMC materials.

Referring now to FIG. 2, a perspective view is provided of a turbine nozzle segment 100 according to an exemplary embodiment of the present subject matter. A turbine stator is formed by a plurality of turbine nozzle segments 100 that are abutted at circumferential ends, e.g., ends or sides spaced apart along a circumferential direction C, to form a complete ring about centerline 12. Each nozzle segment 100 may comprise an inner band 102 and an outer band 104 with one or more vanes 106 extending from inner band 102 to outer band 104. In some embodiments, vanes 106 may be vanes 68 of HP turbine 28 or vanes 72 of LP turbine 30 described above. Each stator vane 106 includes an airfoil 108 having a concave pressure side 110 (FIGS. 4A, 6A) opposite a convex suction side 112. Opposite pressure and suction sides 110, 112 of each airfoil 108 extend radially along a span S (FIGS. 3A, 5A) from a vane root at inner band 102 to a vane tip at outer band 104. Moreover, pressure and suction sides 110, 112 of airfoil 108 extend axially between a leading edge 114 and an opposite trailing edge 116. Leading edge 114 defines a forward end of airfoil 108 (labeled FWD in the Figures), and trailing edge 116 defines an aft end of airfoil 108 (labeled AFT in the Figures). Pressure and suction sides 110, 112 of airfoil 108 define an outer surface 118 of the airfoil. Additionally, airfoil 108 may define one or more cavities 115 (e.g., as shown in FIG. 3A) adjacent leading edge 114 for receiving a flow of cooling fluid, e.g., a flow of pressurized air diverted from HP compressor 24. As such, each cavity 115 may provide cooling to the portion of airfoil 108 adjacent the leading edge 114. In an exemplary embodiment, airfoil 108 is formed from a CMC material, e.g., as described in greater detail below, such that airfoil 108 is a CMC airfoil. In other embodiments, airfoil 108 may be formed from another appropriate material.

FIG. 3A provides a radial cross-section view of turbine nozzle segment 100 according to an exemplary embodiment of the present subject matter. FIG. 3B provides a cross-sectional view of a portion of airfoil 108 of turbine nozzle segment 100 according to an exemplary embodiment of the present subject matter. As shown in FIGS. 3A and 3B, airfoil 108 includes a trailing edge portion 120 that is defined adjacent the trailing edge 116 at the aft end of airfoil 108. Referring particularly to FIG. 3B, a plurality of pockets 122 are defined in the trailing edge portion 120. Each pocket 122 extends axially within the trailing edge portion 120. More specifically, in the illustrated embodiment, each pocket 122 extends axially from an aft portion of cavity 115 toward the trailing edge 116 of airfoil 108 such that a forward end 122F of each pocket 122 is defined at cavity 115 and an aft end 122A of each pocket 122 is defined aft of the cavity 115 toward trailing edge 116. Further, the plurality of pockets 122 are radially spaced apart from one another, i.e., the plurality of pockets 122 are individually defined along the radial direction R.

As depicted in FIG. 3A, a heat pipe 124 is received in each pocket of the plurality of pockets 122. Each heat pipe 124 includes a body having an evaporator portion 124E and a condenser portion 124C. Heat is absorbed or transferred from the trailing edge portion 120 into evaporator portion 124E of heat pipe 124, particularly a vaporizable liquid in heat pipe 124. The heat is then dissipated through condenser portion 124C into its environment, e.g., into cavity 115 and/or into a relatively cooler segment of airfoil 108 than the segment near trailing edge 116. That is, in embodiments such as the embodiment depicted in FIG. 3A, the condenser portion 124C of each heat pipe may be positioned at the cavity 115 to dispel heat from the trailing edge portion 120 of airfoil 108 into the cavity 115. In some embodiments, a fluid, such as cooling fluid F within cavity 115, may flow over condenser portion 124C and thereby dissipate the heat more quickly. As a particular example, FIG. 3C depicts an embodiment in which the condenser portion 124C of each heat pipe 124 extends into cavity 115. In embodiments such as the embodiment of FIG. 3C, the cooling fluid F may more readily flow over the condenser portion 124C, which can help more quickly dissipate heat absorbed at the evaporator portion 124E of the heat pipe. In other embodiments, the condenser portion 124C may extend to, but not into, cavity 115 such that the cooling fluid F flows over an end of condenser portion 124C positioned at cavity 115, as illustrated in FIG. 3A.

Each heat pipe 124 uses a liquid that evaporates by absorbing the heat from a hot end, i.e., evaporator portion 124E. The vapor generated then travels through a channel formed within the body of the heat pipe 124 that extends from the evaporator portion 124E to the condenser portion 124C, and the vapor condenses at the cold end, i.e., condenser portion 124C, thereby transferring heat to the cold end. A capillary structure or wick that extends from one end of the heat pipe to the other is saturated with a volatile or working fluid to transport the condensed liquid back to the hot end by capillary action, thus completing the circuit.

A working fluid and a body material of heat pipe 124 may be selected based on operating conditions of turbofan engine 10 and, more particularly, core turbine engine 16. In one exemplary embodiment, heat pipe 124 may experience operating temperatures between about 1000° C. and 1100° C. In such an embodiment, suitable working fluids include lithium (Li) and sodium (Na), although other working fluids also may be appropriate. Further, the body of heat pipe 124 may be made from a niobium-zirconium (Nb—Zr) alloy such as Nb-1% Zr, or from a sintered niobium-zirconium (Nb—Zr) alloy such as Nb-1% Zr, e.g., if the working fluid is sodium. The axial heat flux of each heat pipe 124 constructed using these working fluids and body materials may be about 200 W/cm$^2$. Other heat flux values may be possible using other working fluids or body materials.

FIG. 4A provides an axial cross-section view of airfoil 108 according to an exemplary embodiment of the present subject matter. FIG. 4B provides a perspective view of a heat pipe 124 according to an exemplary embodiment of the present subject matter. As shown in FIGS. 4A and 4B, each heat pipe 124 may have a generally trapezoidal shape, e.g., such that the heat pipe tapers to fit within airfoil 108 as the airfoil tapers along its width in the trailing edge portion of the airfoil. In other embodiments, however, heat pipe 124 may have any appropriate shape, e.g., heat pipe 124 may be generally cylindrical or polyhedral in shape.

Turning to FIGS. 5A and 5B, in another embodiment of airfoil 108 and turbine nozzle section 100, heat pipes 124 may extend radially rather than axially within trailing edge portion 120 of airfoil 108. As illustrated in FIG. 5B, one or more pockets 122 may be defined in the trailing edge portion 120 of airfoil 108 such that each pocket 122 extends radially within the trailing edge portion 120. More particularly, in the depicted embodiment of FIG. 5B, each pocket 122 extends radially within trailing edge portion 120 adjacent an aft portion of cavity 115 such that an inner end 122I of each pocket 122 is defined closer to the airfoil root than an outer end 122O, which is defined closer to the airfoil tip than the inner end 122I of the respective pocket. Further, each pocket 122 is radially spaced apart from another pocket 122 defined within the airfoil 108, i.e., each pocket 122 is individually defined along the radial direction R.

As depicted in FIG. 5A, one or more pockets 122 may be defined in airfoil 108, and a heat pipe 124 may be received in each pocket 122. As described above with respect to FIG. 3A, each heat pipe 124 includes a body having an evaporator portion 124E and a condenser portion 124C. Heat is absorbed or transferred from the trailing edge portion 120 into evaporator portion 124E of heat pipe 124, particularly a vaporizable liquid in heat pipe 124. The heat is then dissipated through condenser portion 124C into its environment, e.g., into a relatively cooler segment of airfoil 108 such as an inner portion of the airfoil, an outer portion of the airfoil, or a midsection of the airfoil. For example, as illustrated in FIG. 5A, the condenser portion 124C of a radially outer heat pipe 124 may be positioned near the radially outermost portion of airfoil 108 to dispel heat from the trailing edge portion 120 of airfoil 108 into a radially outer portion of the airfoil and/or into outer band 104. Further, the condenser portion 124C of a radially inner heat pipe 124 may be positioned near the radially innermost portion of airfoil 108 to dispel heat from the trailing edge portion 120 of airfoil 108 into a radially inner portion of the airfoil and/or into inner band 102. As such, heat pipes 124 may dissipate heat from a relatively warmer midsection of the airfoil 108 to relatively cooler inner and outer portions of the airfoil. In other embodiments, the condenser portions 124C of the radially inner and outer heat pipes 124 may be positioned near the midsection of the airfoil 108 to dissipate heat from relatively warmer inner and outer portions of the airfoil to a relatively cooler midsection of the airfoil.

As another example, as illustrated in FIG. 5C, the condenser portion 124C of each heat pipe 124 may extend into a cavity defined by, e.g., inner band 102 or outer band 104. In such embodiments, a cooling fluid F within the cavity may flow over the condenser portion 124C, which can help more quickly dissipate heat absorbed at the evaporator portion 124E of the heat pipe. In other embodiments, disposing each heat pipe 124 such that condenser portion 124C extends into a cavity away from the trailing edge portion 120 of airfoil 108 may provide a better heat sink for more efficiently dissipating heat than disposing the condenser portion 124C within the airfoil 108. Accordingly, the heat pipes 124 may be received in pockets 122 in any appropriate orientation for balancing the thermal gradient experienced by a given airfoil.

As described above, each heat pipe 124 uses a liquid that evaporates by absorbing the heat from the evaporator portion 124E, i.e., the hot end, and thereby generating vapor that then travels through a channel formed within the body of the heat pipe 124 and the vapor condenses at the condenser portion 124C, i.e., the cold end. As such, each heat pipe transfers heat from the hot end to the cold end. A capillary structure or wick that extends from one end of the heat pipe to the other is saturated with a volatile or working fluid to transport the condensed liquid back to the hot end by capillary action, thus completing the circuit. The working fluid and body material of heat pipe 124 may be selected based on operating conditions of turbofan engine 10 and, more particularly, core turbine engine 16. As previously described, suitable working fluids include lithium (Li) and sodium (Na) and suitable heat pipe body materials include a niobium-zirconium (Nb—Zr) alloy such as Nb-1% Zr or a sintered niobium-zirconium (Nb—Zr) alloy such as Nb-1% Zr, although other working fluids and body materials also may be appropriate. The radial heat flux of each heat pipe 124 constructed using these working fluids and body materials may be about 200 W/cm$^2$. Other heat flux values may be possible using other working fluids or body materials.

FIG. 6A provides an axial cross-section view of the airfoil 108 of FIG. 5A, and FIG. 6B provides a perspective view of a heat pipe 124 according to an exemplary embodiment of the present subject matter. As shown in FIGS. 6A and 6B, each heat pipe 124 may have a generally cylindrical shape, where a length of each cylinder extends along the radial direction R. In other embodiments, heat pipe 124 may have any appropriate shape, e.g., heat pipe 124 may be generally trapezoidal as shown in FIGS. 4A and 4B, or heat pipe 124 may be polyhedral in shape.

Turning now to FIGS. 7A and 7B, heat pipes 124 may be disposed within trailing edge portion 120 in other configurations as well. Referring particularly to FIG. 7A, some or all of heat pipes 124 may be disposed at an angle with respect to the axial direction A and radial direction R. As depicted in the embodiment of FIG. 7A, one heat pipe 124 extends generally along or parallel to the axial direction A while the other heat pipes 124 within trailing edge portion 120 extend at an angle with respect to the axial direction A and at an angle with respect to the radial direction R. In other embodiments, one or more heat pipes 124 may extend generally along or parallel to the axial direction A and/or the radial direction R while one or more other heat pipes 124 are disposed at an angle with respect to the axial and radial directions A, R. In still other embodiments, referring to FIG. 7B, a plurality of heat pipes 124 may be disposed within trailing edge portion 120 such that a portion of the heat pipes 124 extend generally along or parallel to the axial direction A and the remaining portion of the heat pipes 124 extend generally along or parallel to the radial direction R. In the particular embodiment of FIG. 7B, the radially extending heat pipes 124 are disposed in a radially outer portion of airfoil 108, with the condenser portion 124C of each heat pipe 124 disposed within a cavity defined by outer band 104. However, in other embodiments, the condenser portion 124C may not extend past outer band 104 into the cavity, or the radially extending heat pipes 124 may be disposed within a radially inner portion of airfoil 108 with the condenser portion 124C of each heat pipe extending toward or into a cavity defined by the inner band 102. Other orientations or combinations of orientations of heat pipes 124 within airfoil 108 may be used as well.

In various embodiments of airfoil 108, such as the embodiments illustrated in FIGS. 3A, 3C, 5A, 5C, 7A, and 7B, airfoil 108 includes more than one heat pipe 124. In such embodiments, each heat pipe 124 may have the same shape and size or the plurality of heat pipes 124 may vary in shape and/or size, i.e., each heat pipe need not be the same shape or size. The shape, size, number, position, and orientation of heat pipes 124 may be optimized for each airfoil. For example, the shape, size, number, position, and orientation of heat pipes 124 included within a given airfoil 108 may depend on the relative size of the airfoil, such that, e.g., airfoils of first stage turbine nozzles may have a different shape, size, number, position, and/or orientation of heat pipes 124 than airfoils of second stage turbine nozzles. Moreover, the size, shape, number, position, and/or orientation of heat pipes 124 may depend on the desired cooling effects achieved by the heat pipes. For example, increasing the size and/or number of heat pipes 124 within a given airfoil 108 may enhance the cooling of the trailing edge portion 120 of the airfoil 108. However, defining too many pockets 122 within the airfoil 108 can be detrimental to the strength of the material forming the airfoil. Therefore, an optimal number, shape, size, position, and orientation of heat pipes 124, as well as the corresponding pockets 122 that receive the heat pipes, provides beneficial cooling without overly weakening the airfoil material or otherwise negatively impacting engine performance.

Heat pipes 124, whether extending axially, radially, or otherwise within airfoil 108, provide cooling to trailing edge portion 120, e.g., by providing increased thermal gradient control to reduce thermal stresses in airfoil 108. That is, heat pipes 124 located in trailing edge portion 120 can help even out temperature gradients in airfoil 108 to render airfoil 108 more isothermal than airfoil 108 without heat pipes 124. Particularly in airfoil 108 having cavity 115 that receives cooling fluid adjacent the leading edge 114 of the airfoil, balancing the thermal gradients of airfoil 108 along the axial direction A by also providing cooling adjacent the trailing edge 116 via heat pipes 124 may help improve the life of airfoil 108, as well as the performance of gas turbine engine 10. As described above, heat pipes 124 also may help balance the thermal gradients of airfoil 108 along the radial direction R. Further, as shown, e.g., in FIGS. 3A and 5A, the heat pipe(s) 124 provided in airfoil 108 may be self-contained within the airfoil, i.e., the one or more heat pipes need not protrude into another component of the turbofan engine 10 such as, e.g., within a stream of air from fan section 14.

Thus, a method of cooling an airfoil 108 of, e.g., a turbine nozzle segment 100, includes providing heat pipe(s) 124 within a trailing edge portion 120 of the airfoil 108. The method may include defining pocket(s) 122 in the trailing edge portion 120 and further may include inserting a heat pipe 124 into each pocket 122. The method also may comprise orienting the heat pipe(s) 124 such that an evaporator portion 124E of each heat pipe is adjacent or within a relatively warm portion of the trailing edge portion 120 and a condenser portion 124C of each heat pipe is adjacent or within a relatively cool portion of the trailing edge portion 120. As such, each heat pipe 124 may dissipate heat from the relatively warm portion of the trailing edge portion 120 of the airfoil to the relatively cool portion of the trailing edge portion 120.

Turning back to FIGS. 4A and 6A, airfoil 108 may be a CMC component of engine 10. In some embodiments, inner and outer bands 102, 104 also may be made from a CMC material such that each turbine nozzle segment 100 is a CMC component of engine 10. In the embodiments depicted in FIGS. 4A and 6A, pressure and suction sides 110, 112 of airfoil 108 are defined by a first plurality of CMC plies 150, which also may be referred to as airfoil plies 150. Airfoil 108 further comprises a second plurality of CMC plies 152 defining cavity 115 within airfoil 108; the second plurality of plies 152 also may be referred to as cavity plies 152. Each of the plurality of airfoil plies 150 extends from pressure side 110 to suction side 112 of airfoil 108. Cavity plies 152 define cavity 115 between pressure and suction sides 110, 112, i.e., within airfoil 108. One or more filler packs 154 are positioned between airfoil plies 150 and cavity plies 152 within trailing edge portion 120 of airfoil 108. It will be appreciated that filler pack(s) 154 also may be positioned between airfoil and cavity plies 150, 152 within other portions of airfoil 108. In other embodiments, filler pack(s) 154 may be omitted, and airfoil 108 and its features may be defined by airfoil plies 150 or a combination of airfoil plies 150 and cavity plies 152.

Preferably, but not necessarily, airfoil and cavity plies 150, 152 contain continuous CMC fibers along their lengths. Continuous fiber CMC plies can help avoid relying on the interlaminar capability of the airfoil material to resist stresses on the airfoil. The continuous fibers may be maintained, e.g., by wrapping each airfoil ply 150 from one of pressure and suction sides 110, 112 to the other of pressure and suction sides 110, 112 around one or both of leading and trailing edges 114, 116. Cavity plies 152 may be wrapped around a mandrel or other appropriate support to help maintain continuous fibers in plies 152.

It should be appreciated that, in general, filler packs 154 may be formed from any suitable material and/or by using any suitable process. For example, in several embodiments, each filler pack 154 may be formed from a suitable fiber-reinforced composite material, such as a carbon or glass fiber-reinforced composite material. For instance, one or more fabric plies may be wrapped in a suitable manner to form one or more filler packs 154 defining the desired shape of an interior of airfoil 108, such as by shaping suitable ply packs to form each filler pack 154. In another embodiment, discontinuous materials, such as short or chopped fibers, particulates, platelets, whiskers, etc., may be dispersed throughout a suitable matrix material and used to form each filler pack 154.

Additionally, it should be appreciated that, in several embodiments, each filler pack 154 may correspond to a pre-fabricated component. In such embodiments, the filler pack(s) 154 may be installed within the interior of airfoil 108 during or following manufacturing of the nozzle segment 100. Alternatively, each filler pack 154 may be assembled or otherwise formed within airfoil 108. For instance, when filler pack 154 is formed from one or more fabric plies, the plies may be laid up within airfoil 108 together with the plies being used to create the airfoil structure, e.g., airfoil plies 150 and cavity plies 152.

Various methods, techniques, and/or processes may be used to form pockets 122 in airfoil 108. For example, in embodiments such as the exemplary embodiment of FIG. 4A, a portion of each pocket 122 is defined in cavity plies 152, and the portion of each pocket 122 may be defined in the cavity plies 152 by cutting each individual cavity ply 152 before plies 152 are laid up as part of forming airfoil 108. Plies 152 may be cut, e.g., using a precision Gerber cutter by Gerber Technology of Tolland, Conn. In other embodiments, another type of cutter or other means may be used to form cut-outs in cavity plies 152 to define at least a portion of each pocket 122. Alternatively or additionally, at least a portion of each pocket 122 may be defined using electrical discharge machining (EDM), e.g., EDM drilling, or laser machining, precision machining, or other suitable machining technique or process. For example, using an EDM drilling process, each pocket 122 may be defined through cavity plies 152 and/or in one or more filler packs 154.

In still other embodiments, at least a portion of pockets 122 may be formed using one or more fugitive material inserts. As an example, an insert made from a fugitive material may be in a desired form (e.g., shape, size, etc.) to define an axially or radially extending pocket 122. The fugitive material insert is positioned within the layup as airfoil plies 150, cavity plies 152, and/or filler pack(s) 154 are laid up to form airfoil 108. In some embodiments, the insert may be formed of SiC fibers in a silica carbide matrix. The insert may be one of various forms, such as a tape cast, a preformed silicon dioxide tube, or a rapid prototype polymer coated with boron nitride, and the insert may be formed in various manners, e.g., sprayed, screen printed, or injection molded. It may be desirable that the fugitive material insert be a low melting metal or alloy that may melt during a burnout pyrolysis operation or melt infiltration of a CMC layup preform, to thereby leave a void in the preform. In alternative embodiments, the fugitive material insert may be formed of a high temperature material that will not melt during the burnout pyrolysis operation. Such high temperature material inserts may be placed into the CMC during layup as a flexible tape filled with powders of the high temperature materials. Alternately, all of the high temperature material inserts may be placed into the CMC during layup as a dense, flexible wire or an inflexible rod or tube. Such high temperature materials, after the CMC component is melt infiltrated, may require a subsequent air heat treatment to oxidize the high temperature material, a vacuum heat treatment, an inert gas heat treatment, an acid treatment, a base treatment, combinations thereof, or alternating combinations thereof, to remove the fugitive material. Thus, the fugitive material may be removed by melting, dissolution, sublimation, evaporation, or the like, and various materials are suitable for use as the insert, such as materials that exhibit non-wetting of the CMC preform, low or no reactivity with the constituents of the CMC preform, and/or are completely fusible and drainable at a temperature of a thermal treatment performed on the CMC preform. In one example embodiment, fugitive material inserts for defining pockets 122 are formed of fused silicon dioxide ($SiO_2$) in a tubular shape, i.e., as quartz tubes, which may be positioned in an array within trailing edge portion 120 of a layup of plies 150, 152, and/or filler pack(s) 154 for forming airfoil 108. Following a melt infiltration process, the fused silicon dioxide is reduced to SiO and leaves the CMC component with voids forming pockets 122, into which heat pipes 124 may be inserted.

FIG. 8 provides a chart illustrating an exemplary method 800 for fabricating airfoil 108. As represented at 802 in FIG. 8, plies 150, 152 and filler pack(s) 154 are laid up in the form of airfoil 108, i.e., laid up in a desired shape to produce an airfoil preform assembly. The layup step or portion of the process thus may be referred to as the layup preforming step and generally may comprise layering multiple plies or structures, such as plies pre-impregnated with matrix material (prepreg plies), prepreg tapes, or the like, to form a desired shape of the resultant CMC component, e.g., airfoil 108. The layers are stacked to form a layup or preform, which is a precursor to the CMC component.

In some embodiments, multiple layups or preforms may be laid up together to form the airfoil preform assembly. More particularly, the layup portion 802 of method 800 may include laying up multiple preforms, filler packs, and/or plies to form the airfoil preform assembly. In an exemplary embodiment, the layup portion 802 may include forming a cavity preform and one or more filler pack preforms, which are laid up with airfoil plies 150 as shown at 802a, 802b, and 802c in FIG. 7 to produce the airfoil preform assembly. To form the cavity preform, cavity plies 152 may be laid up, e.g., in or on a layup tool, mandrel, or mold, to generally define the shape of cavity 115 of airfoil 108. The cavity preform may be compacted at atmosphere, i.e., at room temperature, and then processed in an autoclave. The autoclave processing may be performed at a reduced temperature compared to a standard autoclave cycle such that the cavity preform retains some flexibility and malleability after autoclaving. Such flexibility and malleability may help in defining voids (such as a portion of pockets 122) in the cavity preform and/or laying up the cavity preform with other preforms and/or plies to produce the airfoil preform assembly. In some embodiments, the compaction and/or autoclaving steps may be omitted, i.e., the compaction and autoclaving are optional, such that defining the cavity preform comprises laying up cavity plies 152 without additional processing.

The layup preforming shown at 802 in FIG. 7 further may include forming one or more filler pack preforms. For example, filler pack material 154 may be laid up, e.g., in or on a layup tool, mandrel, or mold, to define one or more filler pack preforms. Next, each filler pack preform 154P may be compacted, e.g., at atmosphere as described above with respect to the cavity preform. Then, the filler pack preform(s) may be processed in an autoclave, e.g., at a reduced temperature relative to a standard autoclave cycle such that filler pack preform(s) retain some flexibility and malleability after autoclaving. The flexibility and malleability may help in defining voids in the filler pack preform(s) and/or in laying up the filler pack preform(s) with other preforms and/or plies to form the airfoil preform assembly. More particularly, after autoclaving at a reduced temperature, the filler pack preform(s) are in a green state and retain some flexibility and malleability that can assist in further manipulation of the preform. For example, the voids forming pockets 122 in trailing edge portion 120 of the resultant airfoil 108 may be machined in the green state filler pack preform(s), and the malleability of green state preform may help in machining the pockets 122. In some embodiments, pockets 122 may be formed by machining two green state filler pack preforms, such that one preform defines a first half of each pocket 122 and the second preform defines a second half of each pocket 122. As previously described, the pocket(s) 122 may be formed in filler pack preform(s) using one or more of laser drilling or machining, EDM, cutting, precision machining, or other machining methods. In other embodiments, one or more of the pockets 122 may be formed using fugitive material inserts that are laid up with the filler pack preform.

Laying up the CMC material to produce the airfoil preform assembly also may include laying up airfoil plies 150 with the cavity preform or cavity plies 152 and/or with the filler pack preform(s) or filler pack(s) 154. It will be appreciated that airfoil plies 150 generally define the shape of pressure and suction sides 110, 112 of the resultant airfoil 108. Accordingly, at the layup preforming portion 802 of exemplary method 800, a cavity preform or cavity plies 152, filler pack preform(s), filler pack(s) 154, and/or airfoil plies 150 may be laid up together to form an airfoil preform assembly. As previously describe, in some embodiments, one or more fugitive material inserts may be positioned within the layers of the airfoil preform assembly to form one or more of pockets 122 within airfoil 108.

Next, the airfoil preform assembly is processed as shown at 804 in FIG. 7. For example, the airfoil preform assembly may be processed in an autoclave using a standard autoclave process. As such, the airfoil preform assembly may be processed at a higher temperature than the filler pack preform and the cavity preform described above. After processing, the airfoil preform assembly is in a green state. If pockets 122, or a portion of pockets 122, have not been formed in cavity plies 152, the cavity preform, filler pack(s) 154, and/or the filler pack preform(s) as described above, the pockets 122 (or the portion of pockets 122 that remains to be defined) may be defined in the green state airfoil preform assembly. In various embodiments, defining pockets 122 in the airfoil preform assembly may comprise using one or more of laser drilling or machining, EDM drilling, cutting, or other machining methods to define the pockets.

Then, as shown at 806 in FIG. 7, the airfoil preform assembly may undergo a burn-out cycle, i.e., a burn-out cycle may be performed. In an example burn-out cycle, any mandrel-forming materials, as well as certain fugitive materials or other meltable materials such as additional binders in the CMC plies, are melted to remove such materials. During burn-out, the CMC airfoil preform assembly may be positioned to allow the melted materials to run out of the preform and thus remove the materials from the preform.

Next, as illustrated at 808, the CMC airfoil preform assembly may be subjected to one or more post-processing cycles for densification of the preform assembly. Densification may be performed using any known densification technique including, but not limited to, Silcomp, melt infiltration (MI), chemical vapor infiltration (CVI), polymer infiltration and pyrolysis (PIP), and oxide/oxide processes. Densification can be conducted in a vacuum furnace having an established atmosphere at temperatures above 1200° C. to allow silicon or other materials to melt-infiltrate into the preform component.

Additionally or alternatively, after burn-out and densifying steps 806, 808, the airfoil 108 may be manipulated mechanically or chemically as shown at 810 in FIG. 7 to remove any remaining fugitive material inserted into the preformed shape during the layup preforming portion of method 800. In some cases, the heat treatment may be used to oxidize the insert to an oxide that may be melted or dissolved in an acid or base. In other embodiments, the insert may be directly dissolved in acid or base, or otherwise chemically dissolved. In further embodiments, the insert may be sublimed or evaporated in a vacuum heat treatment. In still other embodiments, the insert may be oxidized and subsequently sublimed or evaporated in a vacuum heat treatment. Mechanical methods may be used to mechanically remove the insert, and such mechanical methods may or may not be used with any of the previously described methods. Various chemical methods may be utilized as well. Of course, in embodiments in which pockets 122 are not formed using a fugitive material, the process of removing the fugitive material as illustrated at 810 in FIG. 7 may be omitted.

After any remaining fugitive material is removed, airfoil 108 may be finished as shown at 812. Finishing the airfoil 108 may include finish machining the airfoil and/or applying an environmental barrier coating (EBC) to the airfoil. Other processes or steps also may be performed to finish airfoil 108 and prepare the airfoil for use in turbofan engine 10.

As described above, a heat pipe 124 may be inserted into each pocket 122 defined in the CMC airfoil 108 such that a heat pipe 124 is received in each pocket 122. The heat pipe(s) 124 may be inserted into pocket(s) 122 at any appropriate point within method 800. For example, the heat pipe(s) 124 may be inserted after the CMC airfoil 108 is finished as illustrated at 812 in FIG. 7. In other embodiments, the heat pipe(s) 124 may be inserted after any remaining fugitive material is removed at 810 but before the airfoil 108 is finished at 812. Other points within method 800 also may be appropriate for inserting heat pipe(s) 124.

Method 800 is provided by way of example only; it will be appreciated that some steps or portions of method 800 may be performed in another order or may be omitted or repeated as needed. Additionally, other methods of fabricating or forming airfoil 108 may be used as well. In particular, other processing cycles, e.g., utilizing other known methods or techniques for compacting CMC plies, may be used. Further, when inner and outer bands 102, 104 are formed from CMC materials, similar methods as described above with respect to method 800 may be used to form the inner band 102 and/or the outer band 104. Moreover, after inner band 102, outer band 104, and airfoil 108 are fabricated from a suitable material, the turbine nozzle segment 100 is assembled such that airfoil 108 extends from inner band 102 to outer band 104. In such embodiments, as well as in other appropriate embodiments, heat pipe(s) 124 may be inserted in pocket(s) 122 of airfoil 108 before the airfoil is assembled with the inner and outer bands 102, 104. In appropriate embodiments, turbine nozzle segment 100 may be formed from a CMC material such that the inner band 102, outer band 104, and airfoil 108 are a single, unitary component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil for a gas turbine engine, comprising:
opposite pressure and suction sides extending radially along a span;
opposite leading and trailing edges extending radially along the span, the pressure and suction sides extending axially between the leading and trailing edges, the leading edge defining a forward end of the airfoil, the trailing edge defining an aft end of the airfoil;
a trailing edge portion defined adjacent the trailing edge at the aft end;
at least two pockets defined in the trailing edge portion, the at least two pockets extending within the trailing edge portion, the at least two pockets radially spaced apart from one another; and
a heat pipe received in each pocket.

2. The airfoil of claim 1, wherein at least one pocket of the at least two pockets extends at an angle with respect to an axial direction.

3. The airfoil of claim 2, wherein the airfoil defines adjacent the leading edge a cavity for receipt of a flow of cooling fluid, and wherein a condenser portion of the heat pipe is positioned near the cavity.

4. The airfoil of claim 1, wherein at least one pocket of the at least two pockets extends radially within the trailing edge portion, and wherein at least one pocket of the at least two pockets extends axially within the trailing edge portion.

5. The airfoil of claim 4, wherein the airfoil defines adjacent the leading edge a cavity for receipt of a flow of cooling fluid, and wherein a condenser portion of the at least one heat pipe extending axially within the trailing edge portion is positioned near the cavity.

6. The airfoil of claim 4, wherein the airfoil defines adjacent the leading edge a cavity for receipt of a flow of cooling fluid, and wherein a condenser portion of the at least one heat pipe extending axially within the trailing edge portion is positioned near an outer band of the airfoil.

7. The airfoil of claim 4, wherein the airfoil defines adjacent the leading edge a cavity for receipt of a flow of cooling fluid, and wherein a condenser portion of the at least one heat pipe extending axially within the trailing edge portion is positioned near an inner band of the airfoil.

8. The airfoil of claim 1, wherein each heat pipe comprises a condenser portion, and wherein the condenser portion of at least one heat pipe of the at least two heat pipes is positioned near the radially outermost portion of the airfoil.

9. The airfoil of claim 1, wherein each heat pipe comprises a condenser portion, and wherein the condenser portion of at least one heat pipe of the at least two heat pipes is positioned near the radially innermost portion of the airfoil.

10. The airfoil of claim 1, wherein each heat pipe comprises a condenser portion, and wherein the condenser portion of at least one heat pipe of the at least two heat pipes is positioned near a radial midsection of the airfoil.

11. The airfoil of claim 1, wherein each heat pipe comprises a condenser portion, and wherein the condenser portion of at least one heat pipe extends into a cavity defined by an outer band of the airfoil.

12. The airfoil of claim 1, wherein each heat pipe comprises a condenser portion, and wherein the condenser portion of at least one heat pipe extends into a cavity defined by an inner band of the airfoil.

13. The airfoil of claim 1, wherein the airfoil is formed from a ceramic matrix composite material.

14. A method for forming a ceramic matrix composite (CMC) airfoil for a gas turbine engine, the method comprising:
laying up a CMC material to form an airfoil preform assembly, the airfoil preform assembly defining an airfoil shape having
opposite pressure and suction sides extending radially along a span,
opposite leading and trailing edges extending radially along the span, the pressure and suction sides extending axially between the leading and trailing edges, the leading edge defining a forward end of the airfoil, the trailing edge defining an aft end of the airfoil, and
a trailing edge portion defined adjacent the trailing edge at the aft end;
processing the airfoil preform assembly to produce a green state CMC airfoil;
defining at least two pockets in the trailing edge portion, the at least two pockets radially spaced apart from one another; and
inserting a heat pipe into each pocket.

15. The method of claim 14, wherein at least one pocket of the at least two pockets is defined such that the at least one pocket extends at an angle with respect to an axial direction.

16. The method of claim 15, wherein the airfoil preform assembly defines adjacent the leading edge a cavity for receipt of a flow of cooling fluid, and wherein a condenser portion of the heat pipe inserted into the at least one pocket is positioned near the cavity.

17. The method of claim 14, wherein at least one pocket of the at least two pockets is defined such that the at least one pocket extends radially within the trailing edge portion.

18. The method of claim 14, wherein the airfoil preform assembly defines adjacent the leading edge a cavity for receipt of a flow of cooling fluid, and wherein laying up the CMC material to form the airfoil preform assembly comprises laying up a filler pack preform, a cavity preform, and a plurality of CMC plies that wrap around the filler pack preform and the cavity preform.

19. The method of claim 18, wherein at least one pocket of the at least two pockets is defined through the cavity preform and the filler pack preform.

20. The method of claim 18, wherein at least one pocket of the at least two pockets is defined in the filler pack preform and is located adjacent the cavity preform when the filler pack preform is laid up with the cavity preform and the plurality of CMC plies to form the airfoil preform assembly.

* * * * *